US008301567B2

(12) United States Patent
Hawkins

(10) Patent No.: US 8,301,567 B2
(45) Date of Patent: Oct. 30, 2012

(54) SYSTEM AND METHOD FOR PROCESSING CHECKS AND CHECK TRANSACTIONS WITH THRESHOLDS FOR ADJUSTMENTS TO ACH TRANSACTIONS

(76) Inventor: Kari Hawkins, Medicine Lake, MN (US)

(*) Notice: Subject to any disclaimer, the term of this patent is extended or adjusted under 35 U.S.C. 154(b) by 411 days.

(21) Appl. No.: 12/387,131

(22) Filed: Apr. 28, 2009

(65) Prior Publication Data

US 2009/0307136 A1 Dec. 10, 2009

Related U.S. Application Data

(63) Continuation-in-part of application No. 12/380,300, filed on Feb. 26, 2009, and a continuation-in-part of application No. 12/317,200, filed on Dec. 20, 2008, and a continuation-in-part of application No. 12/283,524, filed on Sep. 12, 2008, which is a continuation-in-part of application No. 11/699,776, filed on Jan. 30, 2007.

(60) Provisional application No. 60/763,417, filed on Jan. 30, 2006.

(51) Int. Cl.
*G06Q 40/00* (2006.01)
*G06K 5/00* (2006.01)
(52) U.S. Cl. ......................... 705/45; 235/380
(58) Field of Classification Search .............. 705/35–45
See application file for complete search history.

(56) References Cited

U.S. PATENT DOCUMENTS

| 5,265,007 A | 11/1993 | Barnhard et al. |
| 5,583,759 A | 12/1996 | Geer |
| 5,717,868 A | 2/1998 | James |
| 5,910,988 A | 6/1999 | Ballard |
| 5,930,778 A | 7/1999 | Geer |
| 6,032,137 A | 2/2000 | Ballard |
| 7,070,092 B2 * | 7/2006 | Phillips et al. ................ 235/379 |
| 7,386,509 B1 * | 6/2008 | Swift et al. ...................... 705/39 |
| 7,386,511 B2 * | 6/2008 | Buchanan et al. ............... 705/45 |
| 7,503,486 B2 | 3/2009 | Ahles et al. |
| 7,571,848 B2 * | 8/2009 | Cohen et al. ................... 235/379 |
| 7,925,588 B2 * | 4/2011 | Foth ................................ 705/45 |
| 8,121,951 B2 * | 2/2012 | Haschka et al. ................. 705/45 |

(Continued)

OTHER PUBLICATIONS

Anonymous, "ARC Falls under Two ICP Categories", Today. Boston: Feb. 2005, vol. 27, iss. 1; p. 35, 1 pgs.*

(Continued)

*Primary Examiner* — Ella Colbert
*Assistant Examiner* — Mohammad Z Shaikh
(74) *Attorney, Agent, or Firm* — Beck & Tysver PLLC

(57) ABSTRACT

A system and method of processing paper checks that divides into two independent paths the processing of a data file representing a check and the digital image of the check. The data files and image files are separated both in time and in space, with the data files being used to promptly initiate the transfer of funds to and from appropriate accounts, while the paper checks, at a remote location and typically lagging in time, are scanned to create digital image files and deposited as an image or substitute check if deemed ACH ineligible. The method provides for the comparison of data files to image files, based on MICR information, to find any unmatching or mismatched items for exception processing and a process to manage ACH-ineligible items as an image or substitute check. The system and method further provides for sorting exceptions according to transaction type (ACH eligible versus ACH-ineligible) and prioritizing the further processing of the exceptions based on transaction type.

14 Claims, 13 Drawing Sheets

U.S. PATENT DOCUMENTS

| | | | | |
|---|---|---|---|---|
| 8,126,807 | B2* | 2/2012 | Hawkins et al. | 705/45 |
| 8,126,808 | B2* | 2/2012 | Reid et al. | 705/45 |
| 2003/0158811 | A1* | 8/2003 | Sanders et al. | 705/39 |
| 2004/0133516 | A1* | 7/2004 | Buchanan et al. | 705/42 |
| 2004/0148258 | A1* | 7/2004 | Tillett | 705/42 |
| 2004/0236692 | A1* | 11/2004 | Sellen et al. | 705/45 |
| 2005/0071283 | A1* | 3/2005 | Randle et al. | 705/75 |
| 2005/0097046 | A1* | 5/2005 | Singfield | 705/42 |
| 2005/0108168 | A1* | 5/2005 | Halpin et al. | 705/45 |
| 2005/0171899 | A1* | 8/2005 | Dunn et al. | 705/39 |
| 2005/0216409 | A1* | 9/2005 | McMonagle et al. | 705/45 |
| 2006/0184441 | A1* | 8/2006 | Haschka et al. | 705/35 |
| 2006/0229961 | A1* | 10/2006 | Lyftogt et al. | 705/35 |
| 2006/0237526 | A1* | 10/2006 | Mueller et al. | 235/379 |
| 2007/0050292 | A1 | 3/2007 | Yarbrough | |
| 2007/0194102 | A1* | 8/2007 | Cohen et al. | 235/379 |
| 2007/0219904 | A1* | 9/2007 | Kurrasch et al. | 705/40 |
| 2007/0271183 | A1* | 11/2007 | Foth | 705/45 |
| 2009/0182665 | A1* | 7/2009 | Reid et al. | 705/45 |
| 2009/0204540 | A1* | 8/2009 | Hawkins et al. | 705/45 |
| 2009/0236413 | A1* | 9/2009 | Mueller et al. | 235/379 |
| 2009/0307136 | A1* | 12/2009 | Hawkins | 705/45 |
| 2011/0231295 | A1* | 9/2011 | McMonagle et al. | 705/35 |
| 2012/0101947 | A1* | 4/2012 | Hawkins | 705/45 |
| 2012/0109825 | A1* | 5/2012 | Haschka et al. | 705/45 |

OTHER PUBLICATIONS

Sabatini, Patricia, "Checking system to go all-electronic", Knight Ridder Tribune News. Washington: Oct. 31, 2004, p. 1.*

"To ARC or Not to ARC", PBI—Item Processing Report, Jun. 17, 2004, pp. 1-3.*

Anonymous, "NACHA Approves Rules for ARC of Business Checks", Today. Boston: Dec. 2005, vol. 28, iss. 6; p. 9, 1 pgs.*

Oehlsen, Nadia, "Merchants Tackle Two Fronts with ACH Check Conversion", Cards & Payments, Aug. 1, 2008, pp. 1-4.*

Fest, Glen, "Check Conversion: Check and Ach Processing: Besting Both Worlds; NACHA's new back-office processing rule will push the conversion down the line-and expand least-cost routing advantages", Bank Technology News, Jun. 1, 2006, v 19, n 6, pp. 12-13.*

Nov. 13, 2008 Office Action (U.S. Appl. No. 11/699,776).
Sep. 30, 2009 Office Action (U.S. Appl. No. 11/699,776).
Mar. 1, 2010 Office Action (U.S. Appl. No. 12/317,200).
May 3, 2011 Office Action (U.S. Appl. No. 12/317,200).
May 5, 2011 Office Action (U.S. Appl. No. 12/283,524).
Aug. 8, 2011 Office Action (U.S. Appl. No. 11/699,776).
Jun. 9, 2011 Office Action (U.S. Appl. No. 12/380,300).

* cited by examiner

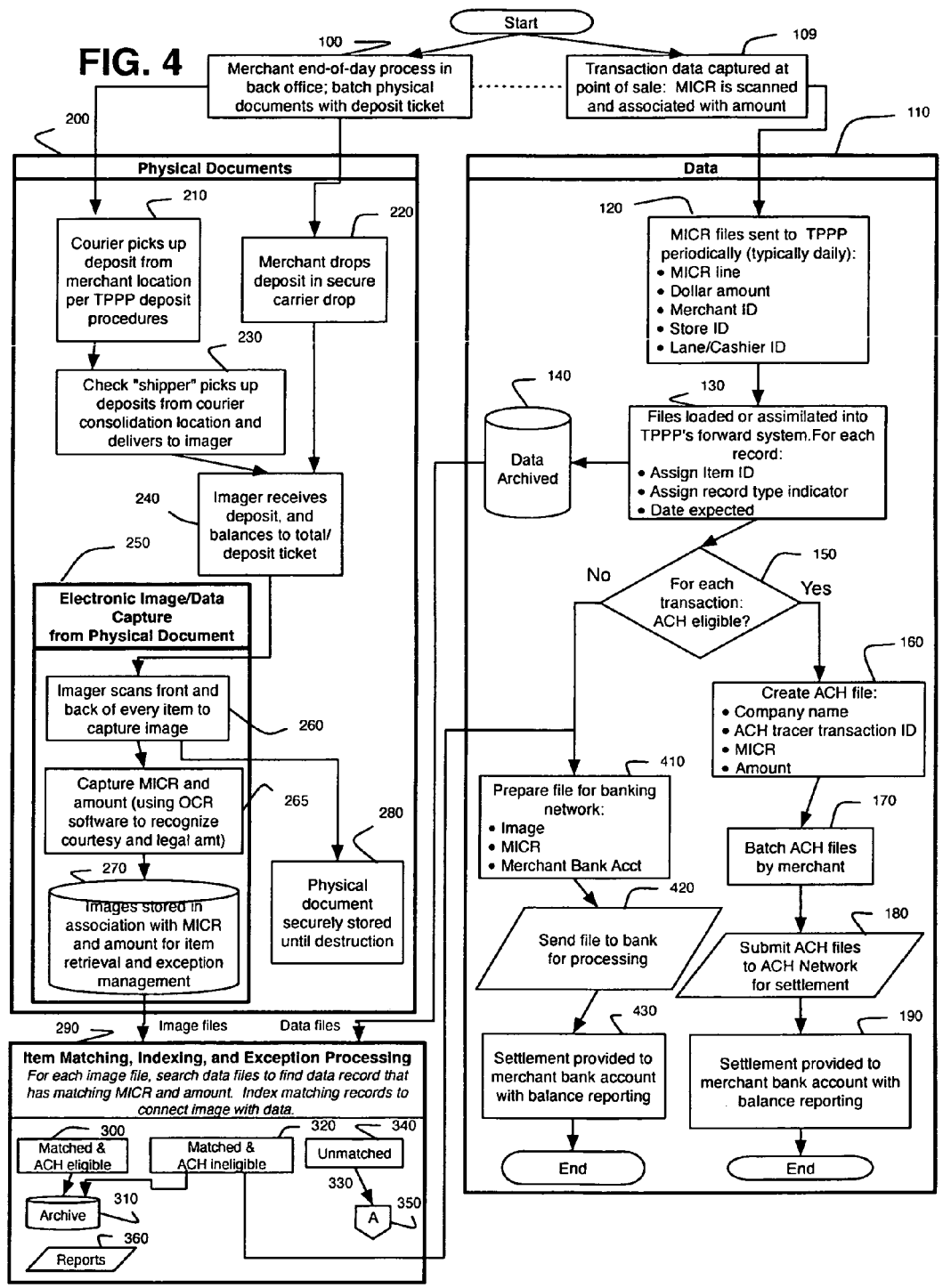

Fig. 5

DO NOT DEPOSIT

Checks have been
electronically deposited

COMPANY NAME

Point-of Sale Date: [ / / ]

Total Item Count: [ # ]

Total Deposit: [ $ ]

Location (Store #): [ 12345 ]

DDA: [ 99999992 ]

Sign-Off Initials: [ ]

This deposit is proprietary, privileged, confidential, and not to be deposited at any Financial Institution.

If you have received this deposit of checks,
DO NOT DEPOSIT.
For questions, please contact:

TO REORDER, CALL 1.888. AND REFERENCE ORDER #:

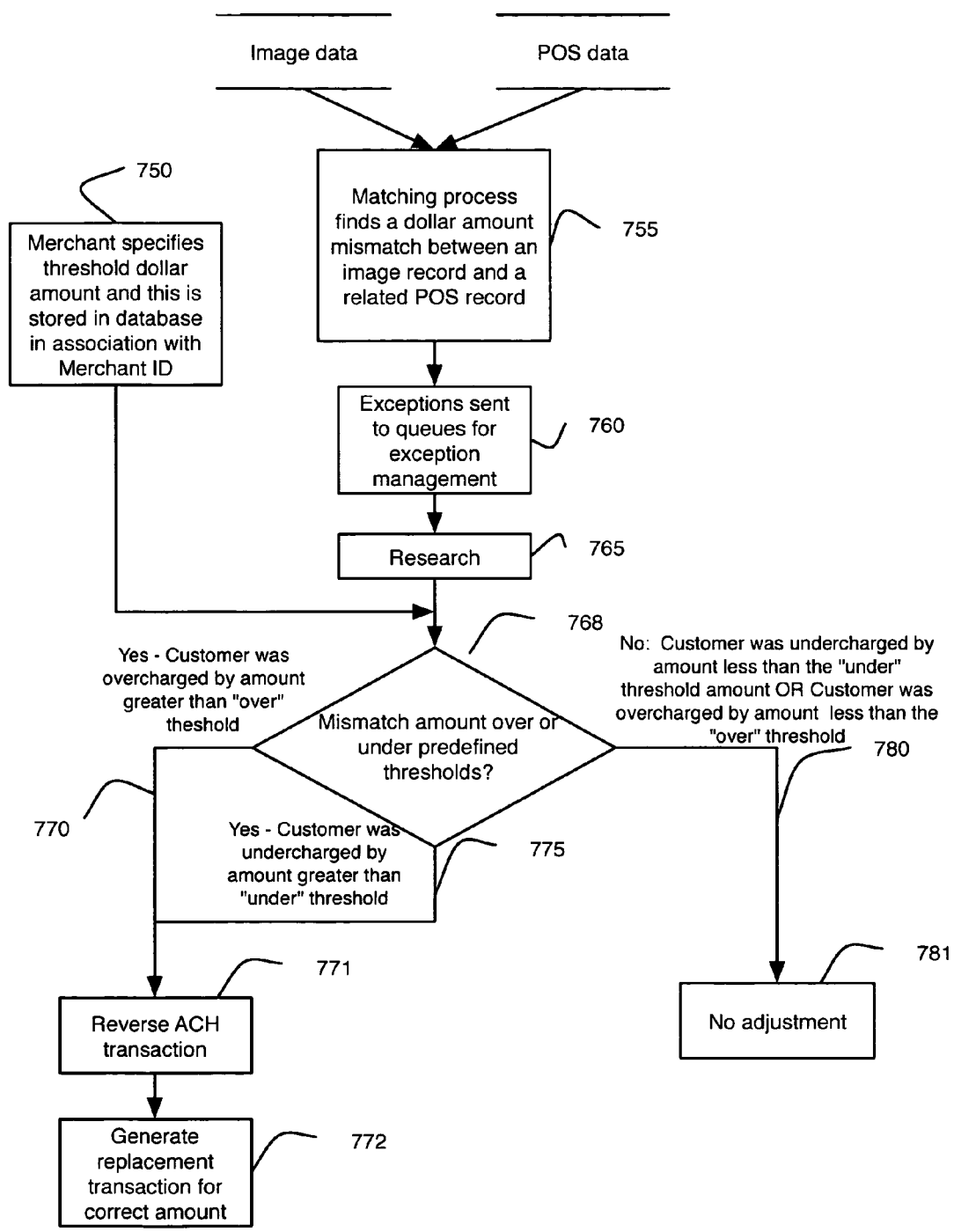

| TABLE 1: MICR Translation | "4610" MICR | "TOAD" MICR |
|---|---|---|
| Transit | T | T |
| On-Us | A | O |
| Amount | S | A |
| Dash |  | D |

SYSTEM AND METHOD FOR PROCESSING CHECKS AND CHECK TRANSACTIONS WITH THRESHOLDS FOR ADJUSTMENTS TO ACH TRANSACTIONS

CROSS-REFERENCE TO RELATED APPLICATION

This application is a continuation-in-part application of U.S. Ser. No. 12/380,300, filed Feb. 26, 2009 and a CIP of U.S. Ser. No. 12/317,200, filed Dec. 20, 2008 and a CIP of U.S. Ser. No. 12/283,524, filed Sep. 12, 2008, both of which are continuations-in-part of U.S. Ser. No. 11/699,776, filed Jan. 30, 2007 which in turn claims the benefit of U.S. Ser. No. 60/763,417, filed Jan. 30, 2006, each of which is incorporated herein in its entirety.

FIELD OF THE INVENTION

The present invention relates generally to a system and method of processing checks and check transactions, and more particularly to capturing data from a check at point of sale and later and remotely capturing the image of the check for later matching of the check image with the check data.

BACKGROUND OF THE INVENTION

A. Paper Checks—Functions Served by Paper Checks and How Paper Checks Were Physically Processed Historically Conceptually, a paper check is a vehicle for two things: 1) the data pertinent to the financial transaction; and 2) evidence of the authorization given by the check writer (the "payer") to transfer funds from the payer's account to the designated payee and evidence that the financial information was accurately extracted and recorded from the check.

Historically, the processing of paper check transactions was slow and labor-intensive. When one entity ("payer") paid another entity ("payee") with a paper check, the payee would physically transport the paper check to its own bank, i.e. a bank with which the payee had an account. The payee's bank would process the check, by reading and recording pertinent information about the transaction represented by the check. The payee's bank would sort by payers' bank all of the checks it received within a given period and physically transport those checks to the payers' banks. The payer bank would then read and record the pertinent information about the transaction contained on the check and make the appropriate debit entry to the payer's account. The payer bank would then transfer funds to the payee's bank. Finally, the payee's bank would make the appropriate credit entry to the payee's account.

The physical transport and handling of the paper checks was highly inefficient. Further, both the payer and payee banks had to process the check to collect and record pertinent information, with such double processing is time-consuming and prone to error.

B. Electronic Processing of Check Transaction

The digital age has ushered in a new approach to processing checks. Over the past decade, there has been an industry transition to the electronic processing of checks. Electronic processing involves the recordation of the data (hereafter "transaction information") presented by the check into a digital format which can then be transferred electronically, via the internet or other connection between computer networks, between and amongst independent entities (such as banks and third party processors) without the need to physically transfer the paper check. Transaction information includes:

the amount of the check;
the routing number of the bank holding the account on which the check is written;
the account number of the payer;
the check number; and
the date of the check.

By converting the transaction information described by the check into digital form that can be electronically transmitted, it is not always necessary to physically move the paper check from one entity to another to accomplish the proper debiting and crediting of the financial transaction. Electronic transfers of funds from a payer to a payee (or, more precisely, from the account of the payer to the account of the payee) are facilitated by the Automated Clearing House Network (ACH).

There remain, however, a number of functions served by the paper check that are not served by the digital file of the transaction data. For example, the paper check can be used as evidence that the transaction was authorized by the check writer, or conversely that the check was forged. The paper check can be used as proof that there was an error in the capture of transaction information. An endorsement and appropriate stamp(s) on the paper check provides proof that the transaction was paid, thereby acting as a receipt. Further, when a check bounces due to insufficient funds, the paper check can be returned and is proof that the payer owes the payee the designated amount and that the amount has not been paid.

D. Check 21—Image Exchange and Substitute Checks

To accommodate the two competing ideals of getting rid of the burdens of handling paper checks and maintaining a paper document that can be used as proof when necessary, the U.S. federal government recently has passed legislation ("Check Clearing for the 21$^{st}$ Century Act"; hereafter "Check 21") that creates a negotiable instrument called a "substitute check". The substitute check is a paper reproduction that is generated from a stored digital image of the original check. The original check can be scanned and its digital image stored for later use in generating the substitute check. The original check can then be safely destroyed or disposed of.

If a substitute check meets the requirement of the Act, then it is the equivalent of an original paper check. A substitute check has the following physical characteristics:

contains an image of the front and back of the original check;
bears a MICR (Magnetic Ink Character Recognition) line containing all the information appearing on the MICR line of the original check;
conforms, in paper stock, dimension, and otherwise, with generally applicable industry standards; and
is suitable for automated processing in the same manner as the original check.

E. Point of Purchase (POP) Conversion

The National Automated Clearing House Association (NACHA) develops operating rules and business practices for the Automated Clearing House (ACH) Network and for electronic payments in the areas of Internet commerce, electronic bill and invoice presentment and payment (EBPP, EIPP), e-checks, financial electronic data interchange (EDI), international payments, and electronic benefits transfer (EBT). NACHA's rules have, since 2000, provided for merchants to convert checks to an ACH debit at the point of purchase ("POP conversion"). NACHA's POP conversion rules required merchants to obtain the explicit authorization (i.e. signature) of the consumer to debit their account. The merchant then returns the check to the consumer along with a receipt as required by the NACHA POP rules and regulations.

At their option, merchants may keep an image of the check, though POP conversion rules do not require that the merchant keep an image of the check.

F. Back Office Conversion and New NACHA Rules

An alternative method of handling checks has been proposed by NACHA for "back office conversion" (BOC), by which merchants scan their checks in a back office, typically at the end of a day. The scanners capture an image of the check and store the image with the MICR data from the check. A file containing this information is then transferred to a bank or third party payment processor.

NACHA has passed this rule, to accommodate back office conversion, which goes into effect on Mar. 16, 2007. These rules require that a digital image of the front of the check be retained for two years, a notice provided to the consumer at point-of-sale prior to the acceptance of the check of payment, and a receipt provided to the consumer with language as depicted by NACHA and the Federal Reserve under Regulation E.

SUMMARY OF THE INVENTION

The present invention provides a system and method for converting checks to debit entries by which data from the checks is captured at the point of purchase and this data is used to promptly process a deposit to the merchant's account via a third party payment processor (TPPP). Meanwhile, the paper checks collected by the merchant are physically transported from the merchant's place of business to another location for scanning and image capture. Each check image is stored in association with its MICR (Magnetic Ink Character Recognition) line and indexed for future retrieval purposes. The TPPP receives data files from the merchant with the MICR and amount information; the TPPP receives the physical items for scanning and imaging. The TPPP executes a matching operation between the image files and the data files, matching image files with data files based on the MICR, amount, and auxiliary information. Routines are provided for handling image files with no matching data file, data files with no matching image files, and image and data files that find a MICR match but include some discrepancy in their data (e.g. amounts do not match). The non-ACH items that find a successful match, are rendered via image exchange for settlement.

With this system and method of processing checks, the data file is used to promptly process the transaction (and send a credit to the merchant's account) through a third party payment processor. In other words, the third party payment processor can initiate the credit to the merchant's account before the image of the check is matched up to the data file, or perhaps even before the image of the check is made for ACH eligible items (i.e. first-party consumer checks and business checks that do not contain an auxiliary on-us field). In this manner, the third party payment processor can provide the merchant with improved funds availability, while still providing for the storage of the image of the check, and destruction, as required by rules and regulations governing check processing.

This system and method allows for the storage and use (e.g. reporting) of a variety of data regarding each check that may be captured at the point of sale. Such data includes MICR line (routing number, account number, check number), dollar amount, store identifier, lane/cashier identifier, point-of-sale date, and other merchant defined auxiliary information.

The system and method offers the further advantage that merchant's are relieved of the task, cost, and risk of scanning and destroying the paper checks themselves, relying instead on a secure, high-volume scanning operation to obtain digital images of the checks. This method further provides for the digital archiving of check images for prescribed periods of time.

In typical practice, many merchants have more than one location, and the system and method provide for service to more than one location of a merchant. Further, the system and method provide for service to more than one merchant. The system and method for processing check transactions is generally automated to allow processing of a high volume of check transactions from a number of merchants and to accommodate multiple locations of the merchant(s).

A method for processing paper checks according to this system including the steps of: at the merchant's point of purchase, capturing the amount of the transaction and associating that amount in a data file with MICR information for each paper check, or batch of paper checks; sending a batch of said data files representing said batch of checks to a third party payment processor without an image file; physically transporting said batch of checks to a location remote from said merchant; scanning said batch of checks thereby creating a digital image of the checks and, for each said check, associating said image with said check's MICR information; and comparing said image files with said data files to find matches.

For assistance in smoothing the conversion process when a new merchant or new store moves to the described system and method from their previous practice (traditional paper settlement or POP conversion), the system provides a trial protocol for transactions passing through the system during a predetermined trial period.

BRIEF DESCRIPTION OF THE DRAWINGS

An exemplary version of the check processing system and method is shown in the figures wherein like reference numerals refer to equivalent structure throughout, and wherein:

FIG. 4 is a flow chart showing the system and method of FIG. 3, with additional details shown regarding processing of exceptions (Solutran model);

FIG. 5 is a deposit ticket used in the system and method of FIGS. 3 and 4;

FIGS. 6a-d are flow charts showing a portion of the system and method of FIG. 4, with details of the process for matching data files to image files where exceptions are found;

FIG. 9 is a table used in conjunction with the MICR handling process shown in FIG. 8;

DETAILED DESCRIPTION OF PREFERRED EMBODIMENT(S)

Figure 1:
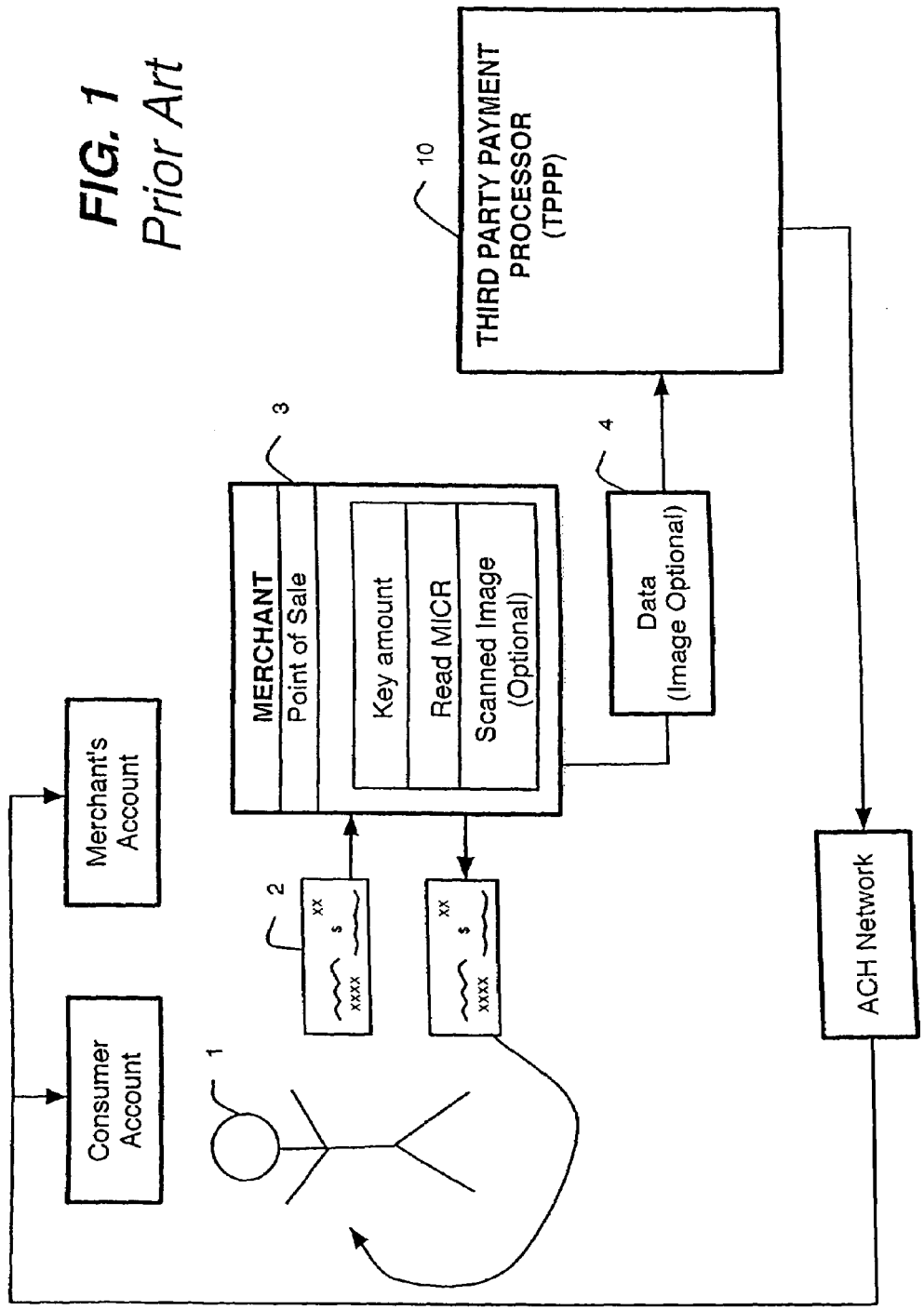
FIG. 1 is a schematic representation of a prior art method of converting a check at the point of purchase (ACH code POP)

FIG. 1 shows a prior art system and method for converting a check at the point of purchase (POP conversion). A consumer 1 pays for goods or services with a check 2.

At the point of purchase terminal 3, the merchant keys, or applies amount captured at POS, into the terminal the amount of the purchase. The merchant also passes the check through a MICR (magnetic ink character recognition) reader to capture the consumer's account number, routing number of the financial institution holding the account, and the check number. Optionally, the merchant may also capture a digital image of the check. The merchant determines eligibility based on current NACHA rules, and returns the check to the consumer for the ACH eligible items. The merchant then transfers a file 4 containing this captured information to a third party payment processor (TPPP) 10. Typically, the merchant would periodically (typically daily) send batches of these transaction files. The TPPP would then process the transaction as an ACH payment.

Figure 2:
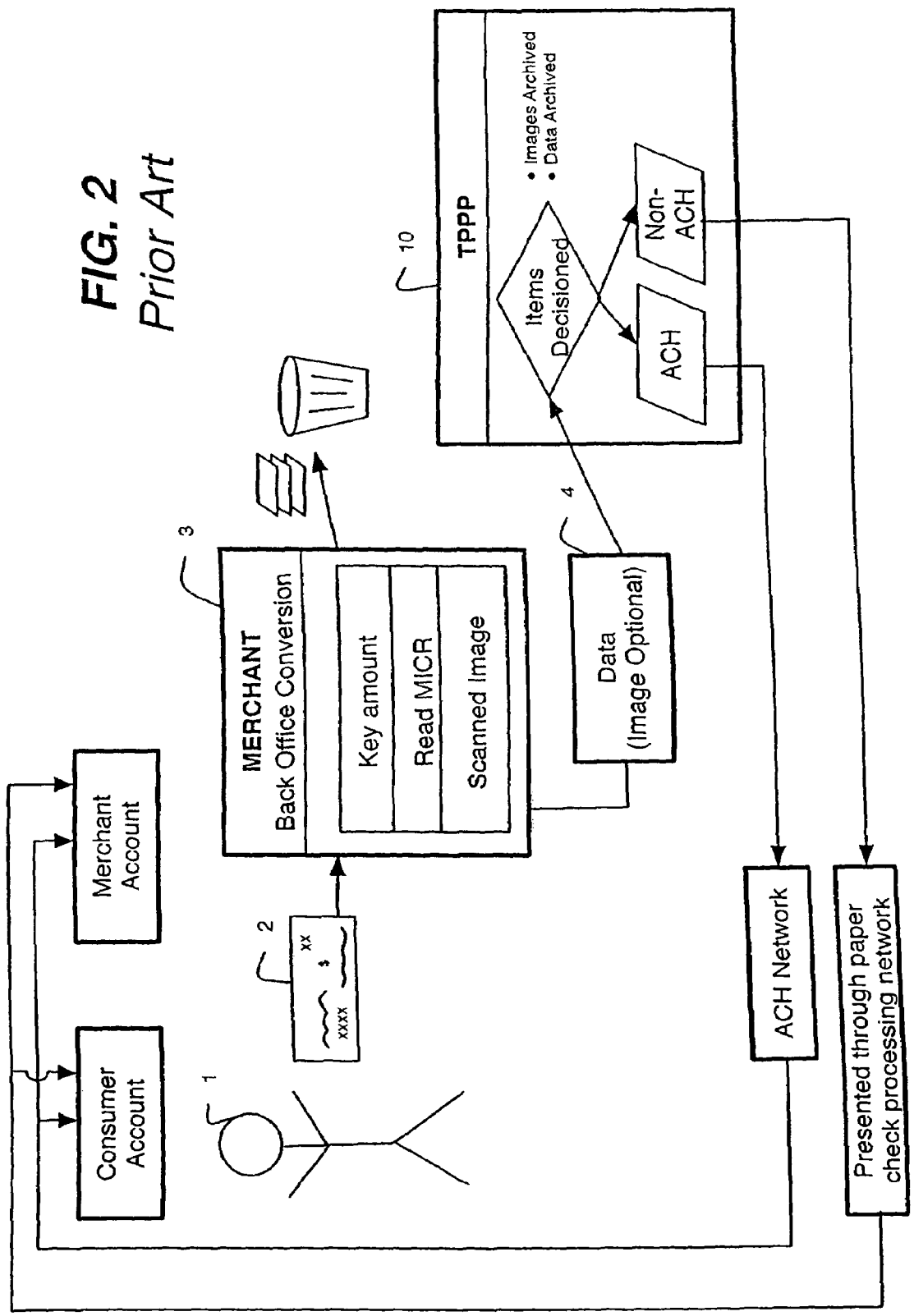
FIG. 2 is a schematic representation of a prior art method of converting a check in the back office (Traditional BOC model)

FIG. 2 shows a prior art system for converting a check in the merchant's back office. With this system, the merchant scans their checks in batches in a back office, instead of at the purchase terminal.

Figure 3:
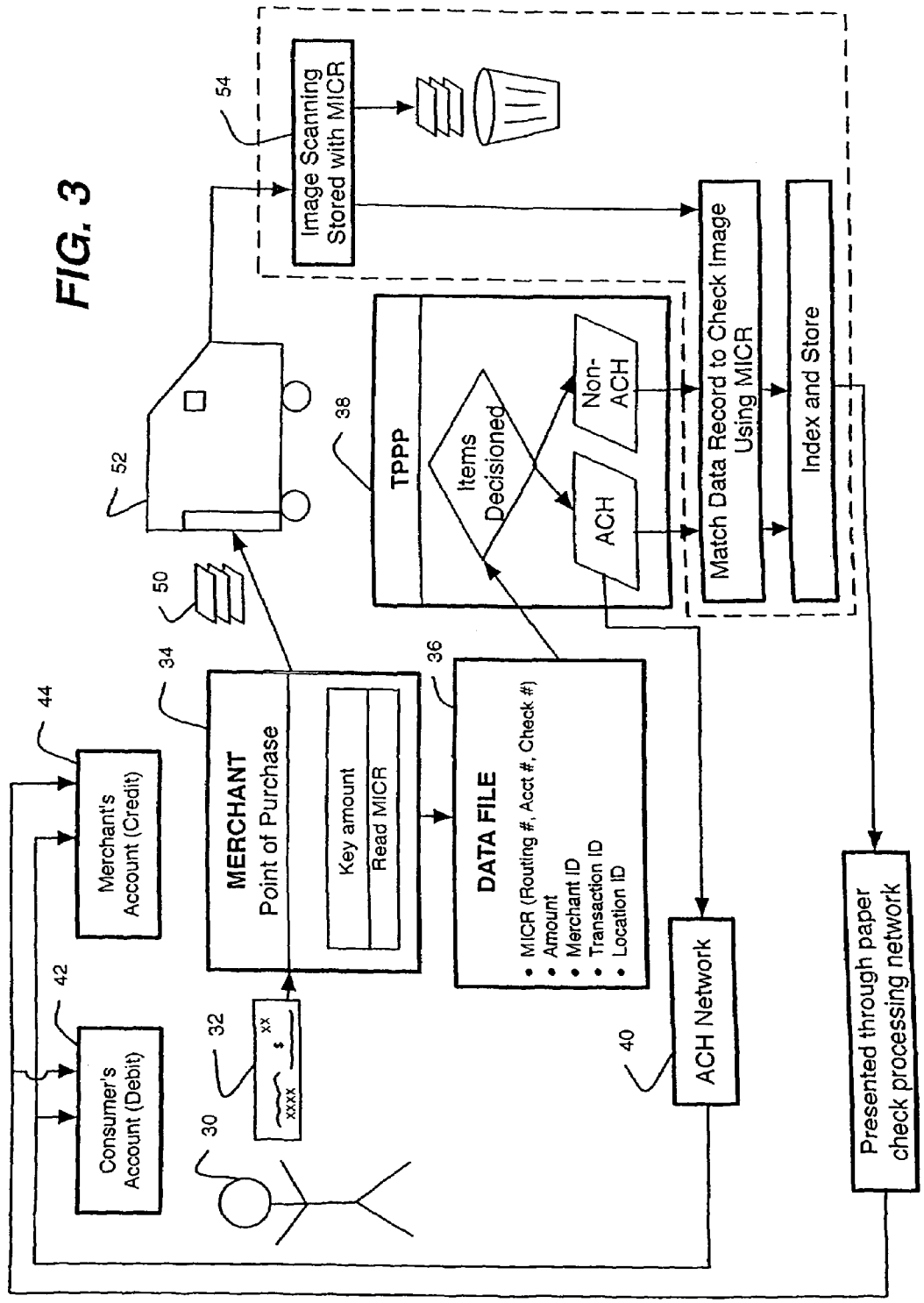
FIG. 3 is a schematic representation of a system and method for processing checks that entails transferring check data independently of a check image, and later connecting check images with their respective check data (Solutran model)

FIG. 3 shows a system 1 and method of processing checks by which the physical checks and their data files are initially (when they leave the merchant) separated. FIG. 3 depicts the system generally and conceptually. (FIGS. 4 and 6 depict the process, or portions of the process, with greater detail.) Ultimately, the data files are matched up to the image files for reconciliation. More specifically, a consumer 30 pays a merchant with a check 32. At the merchant's point of purchase 34, the cashier keys in the amount of the purchase, or applies amount captured at POS, and passes the check through a MICR reader that reads the MICR line of the check and converts the MICR information to digital form. The MICR reader communicates directly or indirectly with the POS device that captures the amount, creating a digital record for each check transaction.

Periodically (typically daily), the merchant sends a data file 36 to a third party payment processor 38, reflecting a batch of such check transactions that have occurred during the period. More specifically, the merchant computer or server transfers the POS data file 36 to a TPPP computer or server over a computer network via a pre-defined file transfer protocol. The data file 36 contains at least the following information about each transaction: the MICR information (routing number, account number, and check number) and the amount. The data file 36 also includes an identifier for the merchant, location identifier, and a transaction identifier, with at least one of these identifiers being unique or with some combination of these identifiers being unique across the system that typically involves multiple merchants, each with multiple locations and with multiple transactions being processed within the reporting period.

The TPPP decisions the received data files, determining which are eligible for processing through the Automated Clearing House (ACH) 40, and which are not. ACH transactions are passed through the ACH network for processing and appropriate debiting of the consumer's account 42 and the crediting the merchant's account 44, respectively. More specifically, the TPPP computer sends data files reflecting the ACH transactions into the ACH network (i.e. the computers or servers on which the ACH network operates) via pre-defined file transfer protocol.

The merchant 34 periodically physically transfers a batch 50 of its paper checks to a secure courier (e.g. Brinks, UPS or U.S. postal service) 52 for physical delivery to a secure, high-volume scanning operation 54. This scanning service might be provided by the TPPP or may be provided by an independent company, typically in accord with a contractual relationship with the TPPP. The scanning operation 54 scans the checks, creating digital images of the checks that are stored in a digital file in association with their MICR information on the imager's server or computer. Physical checks are securely stored until they are destroyed, based on client specification.

Finally, the image files of the checks are matched to the data files representing the checks using the MICR line, thereby linking the images to the data files. This is achieved by assigning a unique number to each data record, and upon a successful match, indexing the data and image with the unique number for future access in retrieval needs. The MICR line, including the dollar amount, of a check is typically unique and this affords a one-to-one matching based on the MICR line.

This matching operation may be performed on a computer or server operated by the TPPP 38 or by the scanner 54 or by some other entity affiliated with or associated with the TPPP. This matching step is performed to identify any discrepancies between the data files and the image files which represent the checks so that these can be investigated. It will be appreciated that before the matching operation takes place, the matching computer must have access to both the POS data file and the image files created by the imager. When the matching step is performed by the TPPP, the imager transfers the image files from the imager computer to the TPPP computer over a computer network via a pre-defined file transfer protocol. When, alternatively, the matching step is performed by the imager, the TPPP transfers the POS data files from the TPPP computer to the imager computer over a computer network via a pre-defined file transfer protocol. When, as yet another alternative, the matching step is performed by a third party, the TPPP transfers its POS data files and the imager transfers its imager files to the matcher's computer over a computer network via a pre-defined file transfer protocol.

Figure 7:
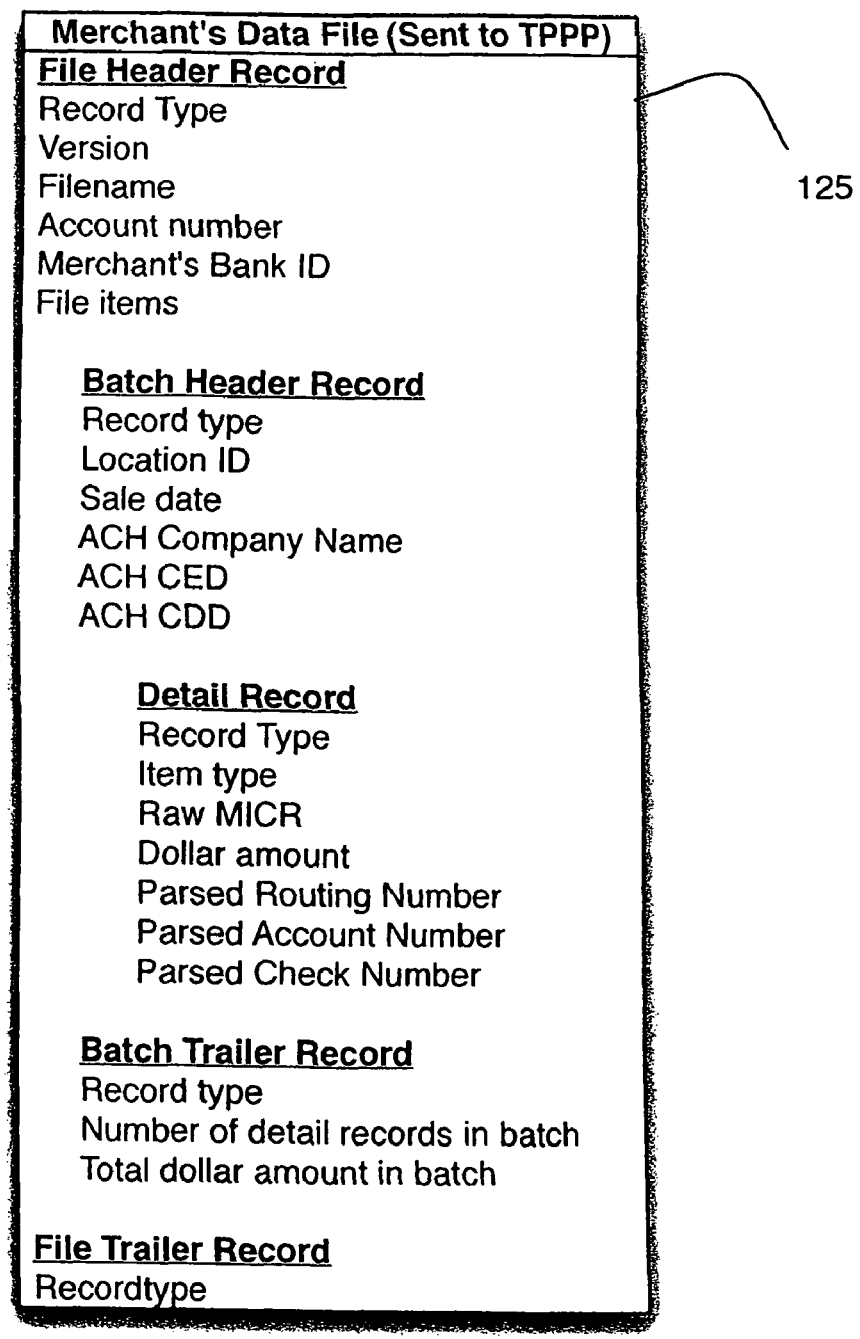
FIG. 7 is an illustration of the format of the data file sent from a merchant to a third party payment processor, according to the system and method of FIGS. 3 and 4.

FIG. 4 shows additional details of portions of the process depicted in FIG. 3 and illustrates the divergent flows for the data collected at the point of sale reflecting the check transactions (110) and for the physical checks and the images of those checks (200). At the point of sale, when a customer presents a transaction document to pay for goods or services, the merchant passes the document through a MICR reader to read the MICR line of the document. In addition, the merchant keys in or otherwise enters an amount for the transaction at the point of sale terminal. The amount and the MICR information are associated in a data file including a merchant identifier, a store identifier, and other various data associated with the transaction A data file containing all of the transactions for a period of time is sent, periodically, typically daily, from the merchant to a third party payment processor (step 120, FIG. 4). The structure of a merchant's data file 125 is illustrated in FIG. 7. The fields identified in this file are as follows:

A File Header Record:
  Record type: a predefined indicator indicating that the record following, until file trailer indication, is a file record
  Version: predefined identifier, identifying a file format version
  Filename: assigned by a merchant Account Number: an identifier unique to the merchant, assigned by the TPPP Merchant's Bank ID: a prescribed identifier for the merchant's bank File items: a count of the number of detail records in this file transmission A Batch Header Record:

Record type: a predefined indicator indicating that the record following, until batch trailer indication, is a batch record Location: identifier for a store location Sale Date: date of sale ACH Company Name: Name of merchant company that will appear on consumer's bank statement (assigned by merchant)

ACH CED: An optional additional field for a merchant description that may appear on consumer's bank statement (assigned by the merchant)

ACH CDD: An optional additional field for merchant's discretionary data (assigned by merchant)

A Detail Record:

Record type: a predefined indicator indicating that the record following, until detail record trailer indicator or batch trailer record, is a detail record Item type: indicates the type of document or transaction (e.g. business check, merchant payroll, non-standard check such as WIC, traveler's check, gift certificate check), personal check or Canadian Amount: Numeric dollar/cents amount of transaction Raw MICR: MICR line, consisting of digits, spaces and TOAD delimiters)

Parsed RT: Parsed Routing Number, an optional field used when merchant's MICR reader parses the MICR to identify the routing number Parsed ACCT: Parsed Account Number, an optional field used when merchant's MICR reader parses the MICR to identify the consumer's account number Parsed CHECK: Parsed Check Number, an optional field used when merchant's MICR reader parses the MICR to identify the check number A Batch Trailer Record:

Record type: a predefined indicator indicating a batch trailer record

Batch Items: number of data records in this batch

Total Amount: total dollar/cents amount of all detail records in this batch

A File Trailer Record:

Record type: a predefined indicator indicating a file trailer record

This data file is sent via data connection, such as from one computer networked, one way or another, to another computer, via a predefined secure socket layer (SSL) file transfer protocol (FTP) As shown in FIG. 4, the payment processor loads or assimilates the merchant's file into its data system, assigning to each transaction record an item identifier, an identifier of the type of the record and calculates a date that the original item or image is expected for matching and archiving (step 130).

In the embodiment of the system and method illustrated in FIG. 4, a process (131) is followed to translate the MICR data that was included with the merchant file received by the TPPP into a desired predetermined format.

A bit of background is required before describing the MICR-handling process (131). Point of sale scanners and data capture systems are manufactured by various entities. Treatment of the MICR data by these point-of-sale systems can vary somewhat. Therefore, it is advantageous for the check processing system and method to include features for handling a variety of MICR data formats.

"Raw" MICR data is a single field having a string of alpha numeric characters. Within the string are the "components" of a MICR line; these components are the routing number, the account number, the check number, the amount of the check (not shown in the MICR line of the check, but added with data from the point of sale terminal), and a dash symbol indicating a separation between fields. (The dash is not always present or required.) Predefined alpha-numeric markers designate the start of each component within the raw MICR string. A common protocol for a raw MICR data is called "TOAD", wherein a first "T" precedes digits representing the routing number and a second "T" is located at and indicates the end of the routing number; a first "0" precedes digits representing the account number and check number and a second "0" is located at and indicates the end of the account number and check number; an A precedes digits representing the amount of the check, and the D precedes a dash. There are, however, alternative protocols for delineating the components of the MICR data within the raw MICR string; i.e. manufacturers of point-of-sale data capture systems may use alternative protocols. For example, IBM's point of sale systems instead use a "T" preceding the routing number, and "A" preceding the account number and check number, a "$" preceding the amount and a dash separates other fields. Other manufacturers may provide still further alternative protocols.

Figure 8:
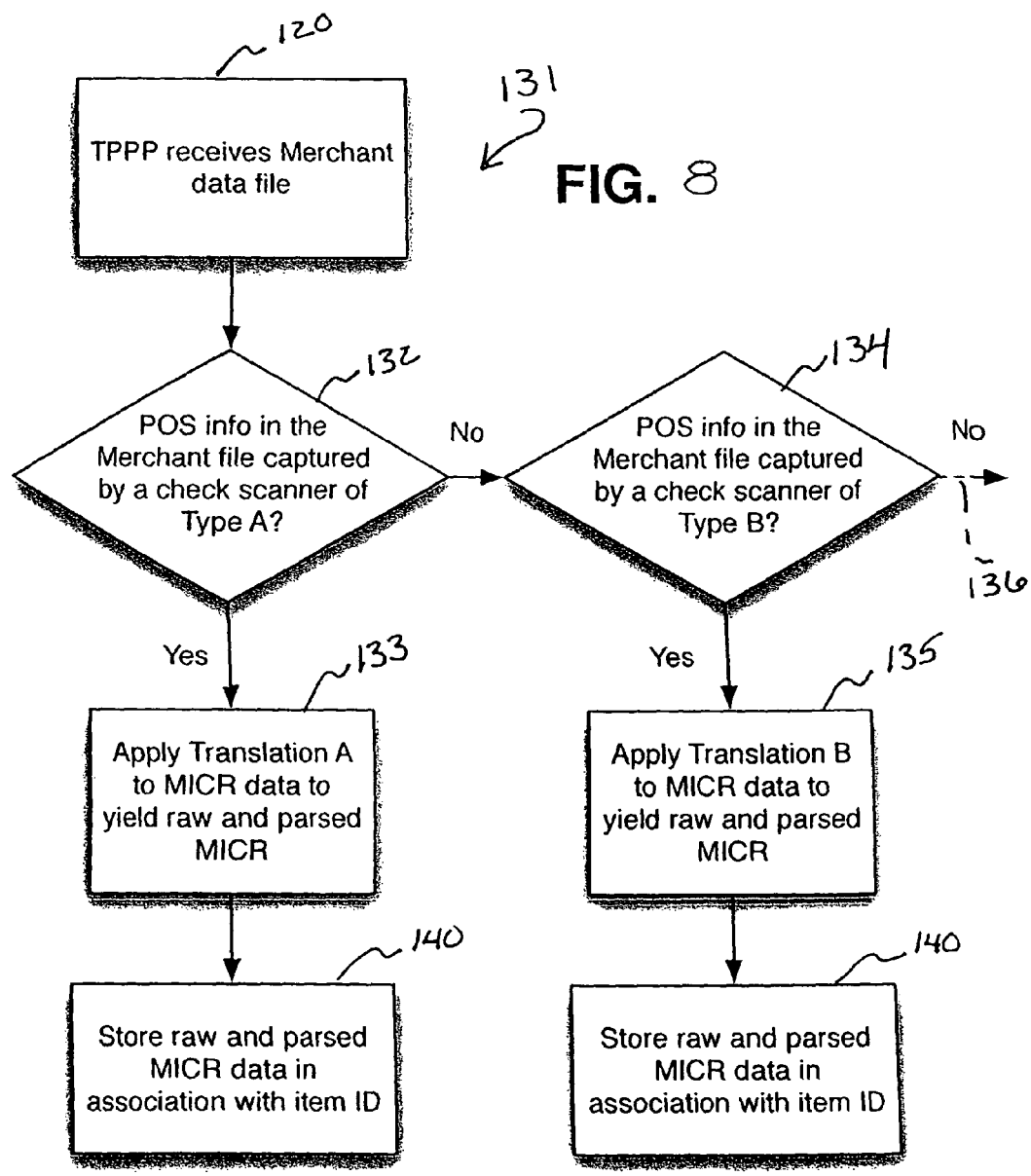
FIG. 8 is a flow chart showing a process for handling MICR data from the merchant data file in a system shown in FIG. 3.

An embodiment of the system and method of the present invention accommodates a variety of raw MICR protocols through process (131), illustrated in FIG. 8. The TPPP receives a merchant's data file (120), as previously described. This file includes raw MICR data formatted according to the protocol of the merchant's point of sale system. The TPPP determines what protocol was used for the incoming raw MICR, then translates the raw MICR into the desired format and then stores that translated raw MICR in association with an item ID along with other transaction data (140). More specifically, following the flow chart of FIG. 8, the system checks (132) to determine if the data in the file is affiliated with a point-of-sale system ("POS system") of a first type, Type A, and if so applies (133) a corresponding translation, Translation A, to yield raw MICR in the desired format. (The POS system employs a scanner connected to various other components, such as a sales terminal and affiliated hardware and software.) If the data in the file is not affiliated with a POS system of Type A, then the check-processing system 1 determines (134) if the data in the file is affiliated with a POS system of a second type, Type B, and if so applies (135) a corresponding translation, Translation B, to yield raw MICR in the desired format. If the data in the file is not affiliated with a POS system of Type B, then further checks (indicated by the dotted line 136) are employed until the proper POS system is identified, so that the corresponding translation can be performed. Some POS systems may provide raw MICR in a format that does not require translation (i.e. is already in the desired format), in which case no translation step is performed.

The database supporting the check-processing system 1 includes a table of POS system systems in association with a definition of their raw MICR protocol. FIG. 9 shows an example of a translation table 137, illustrating how the alpha-numeric symbols of a "4610" system (i.e. T, A, $, –) used to delineate MICR components translate into symbols of a TOAD system (i.e. TOAD, respectively).

In some cases, the merchant's point of sale system may "parse" the MICR data, to divide it into its component parts.

In other words, instead of generating a raw MICR line (in which is included the routing number, account number, and check number), the system may divide this information into its components and store each component in separate fields. Merchant files from such systems will provide "parsed" rather than raw MICR data. To accommodate this parsed MICR data, the MICR-handling process (131) translates this parsed data by combining these separate fields and adding appropriate markers, to yield a raw MICR string of the predetermined, desired format.

Another feature that supports the MICR translation capability is the ability to determine what kind of point-of-sale system is affiliated with the data in an incoming merchant file. This could be accomplished in several ways. For example, the merchant data file may include a field that identifies the point-of sale system, according to a predefined code or designation. Alternatively, the POS system type might be stored in association with a merchant or a location ID, so that upon receipt of the merchant file, the check-processing system 1 can assign or look up the POS system type used by that merchant or location.

In short, the MICR-handling process (131) takes files merchant data files having MICR data in varied formats and translates it into a desired predetermined format. It does this in an automated way, calling upon previously-stored POS system-specific translations, by recognizing the translation that is required, and by making that translation. Automation is accomplished through software running on computer hardware and performing operations on data in digital form. This automation is particularly useful in handling data from many different merchants or locations who use varying protocols for their MICR data.

These records are then stored or archived (140), and processed accordingly as explained further below.

For each transaction record, the payment processor makes a determination as to whether the transaction is eligible for ACH processing or not (150). ACH eligible items include first party consumer checks and small-size corporate checks. (Corporate checks come in two sizes: a "small" size that is approximately the same size as a consumer check, and a larger size.) ACH ineligible items include money orders, WIC checks, travelers checks, large-size corporate checks, government checks, and others as identified under the NACHA rules and regulations. For those records that are ACH eligible, the payment processor creates an ACH file that includes the merchant's name, company entry description, ACH tracer identifier, the MICR line, and the amount of the transaction according to NACHA rules and regulations for ACH BOC processing and various other information. (160).

The payment processor, in typical commercial practice, will provide payment processing services to a number of merchants. On a periodic basis, typically daily, the processor will batch the records of the ACH eligible items by merchant (170), and will submit the batched records in an ACH file to the ACH Network for settlement (180). Thereafter, settlement to the merchant's bank account is made, followed by balance reporting, a confirmation file and a BAI file, typically on the next business day (190).

As noted above, the physical transaction documents that customers present at a point of sale follow a path (200) that is independent of the path (110) of the data reflecting the transaction. At step 100, a merchant gathers a number of transaction documents to be processed. The merchant will do this on a periodic basis, typically at the end of each day. The merchant bundles the transaction documents together and prepares a deposit ticket 201, shown in FIG. 5 to correspond to the bundled documents. The deposit ticket provides spaces for the merchant to summarize the bundled documents with the following data: the point-of-sale date 202, the total item count 203, the total deposit amount 204; an identifier for the store location 205 and an account identifier 206 for the account into which funds should be transferred. Optionally, a pre-printed form, or multiples thereof, are provided to merchants, with the store location 205 and merchant's bank account identifier 206 pre-printed. Further, optionally, the pre-printed form may include a MICR line 207, with a first portion 208 reflecting the location identifier and a second portion 209 reflecting the deposit account number. This MICR aids in later processing of the deposit slip by the check imager. It is a further option, to pre-print the merchant's name on the deposit tickets.

With reference to FIG. 4, the bundled transaction documents are delivered to an image processor. FIG. 4 reflects two examples of how the documents may be transported to the imager. A first option is for a courier to pick up the bundled documents from the merchant (210), and then for a check shipping agent to pick up the bundle from the courier or from the courier's consolidation location and deliver them to the imager (230). An alternate delivery method is for the merchant to drop the bundled documents into a secure carrier (e.g., U.S. Postal Service or United Parcel Service) mail drop (220) for delivery to the imager.

The imager receives the deposited bundle of documents (or typically many deposited bundles of documents, each from one location of a merchant), scans the deposit ticket 201 and uses optical character recognition (OCR) software to interpret the information presented on the ticket 201. (Where a MICR line 207 has been pre-printed on the deposit ticket 201, it may be read by a MICR reader, then scans the ticket and applies OCR, linking the data obtained from the OCR with the MICR-obtained data.) The imager performs a balance to confirm that the amount indicated 204 on the deposit ticket 201, FIG. 5, matches the sum of the documents bundled or included therewith (240, FIG. 4).

As shown in FIG. 4, the imager then captures images of each document (250). More specifically, the imager scans the front and back of every item, captures the MICR and one of or both of the courtesy amount and legal amount using OCR software (265). The front and back images are stored in association with the MICR and amount for item retrieval and exception management (270). The merchant bank account identifier, taken from the deposit ticket that accompanied the batch of checks, is also stored in association with the image, MICR and amount. In accord with federal regulation, the original physical documents must be securely stored until items are destroyed (280).

Next, the process includes an attempt to match each image record to a data record (290), where the data record was generated through path 110 and archived in step 140, described above and includes the MICR information, the dollar amount and an item identifier, merchant bank account, point-of-sale date, and location identifier. More specifically, for each image record, the data files are searched to find a data record with a "matching" MICR and amount. (Alternatively, for each data file, the image files are searched to find a data record with a matching MICR and amount.) "Matching" records are indexed to connect the image with the data.

The system provides for the setting of parameters as to the degree to which the image record and a POS data record must be the same for them to be deemed "matches" or "matching". More specifically, the parameters determine how closely various fields must correlate for records to be deemed "matching". A probability as to likely matching may be determined and used to assist both the identified matches and to aid in processing unmatched records. Fields used in performing comparisons between image records and POS data records include: merchant bank account identifier; sale date; check dollar amount; MICR data (raw or parsed).

For each image record for an ACH eligible item for which a matching data record is found (300), the indexed record (containing the image and data) is archived (310). For each image record for an ACH ineligible item for which a matching data record is found (320), the indexed record (containing the image and data) is archived and an image exchange file is prepared (410) that includes the image, the MICR, the merchant's bank account number and other information as required for image exchange (330). This image exchange file is then transferred via the banking network (420).

Finally, for the ACH-ineligible matched items, settlement is provided to the merchant's bank account based on availability and reported via balance reporting and a non-ACH deposit file, typically the next business day.

Special Processing for Predefined Categories of Records

The system and method may provide for special treatment or attention for records that fall into one or more predefined categories by virtue of having one or more characteristics (such as a predetermined value in one or more fields) and such special treatment may occur before or after transactions have been submitted for settlement. The special treatment may involve additional automated steps or may involve human operator intervention or management. Such "special" items are listed for one or more human operators, for example, by displaying a list of exceptions on a computer monitor in a graphical user interface. The operator will take whatever action is warranted by the exception and provide corresponding input to the system. As an example, one such category is high-dollar value items. The system may be set such that all transactions over a given dollar amount are subjected to special processing; a list of such transactions is provided to a human operator who performs investigative or research steps as prescribed by business practices to, for example, confirm their legitimacy, before completing their processing. Another example of a category that might be treated as "special" may be foreign items, such as checks drawn on the bank in a foreign country.

Exception Processing for Unmatched Records

Situations in which no "match" is found for an image record or for a data record during the matching step (290) after the date that the image from the paper document was expected, are subject to exception processing (350). These "exceptions" are yet another category of records that may be designated for special treatment. More specifically, exception records include those data records for which there is no matching image record and those image records for which there is no matching data record. Whether an image and data record "match" is determined by predetermined matching criteria. The criteria include the field or fields that must match and the sensitivity to deviance that is allowed. For example, in one embodiment, matching may be performed based on MICR; in another embodiment, matching may be performed based on MICR, transaction date, point of sale location identifier, and the direct deposit account identifier of the merchant. (The direct deposit account identifier of the merchant is added to each image record based on the deposit ticket that accompanied a batch of paper checks submitted for processing. In other words, through OCR, the merchant's account number that appears on the deposit ticket that accompanies a batch of paper checks is read, and this merchant's account number is then added to each image record for that batch of checks.) It is advantageous for the system to recognize as "matched" records that may not match exactly, but rather have some discrepancy in one or more of the designated fields. The system preferably recognizes a probability that two records match and will return a "match" where the probability of a match meets a predefined threshold probability.

Figure 6A:
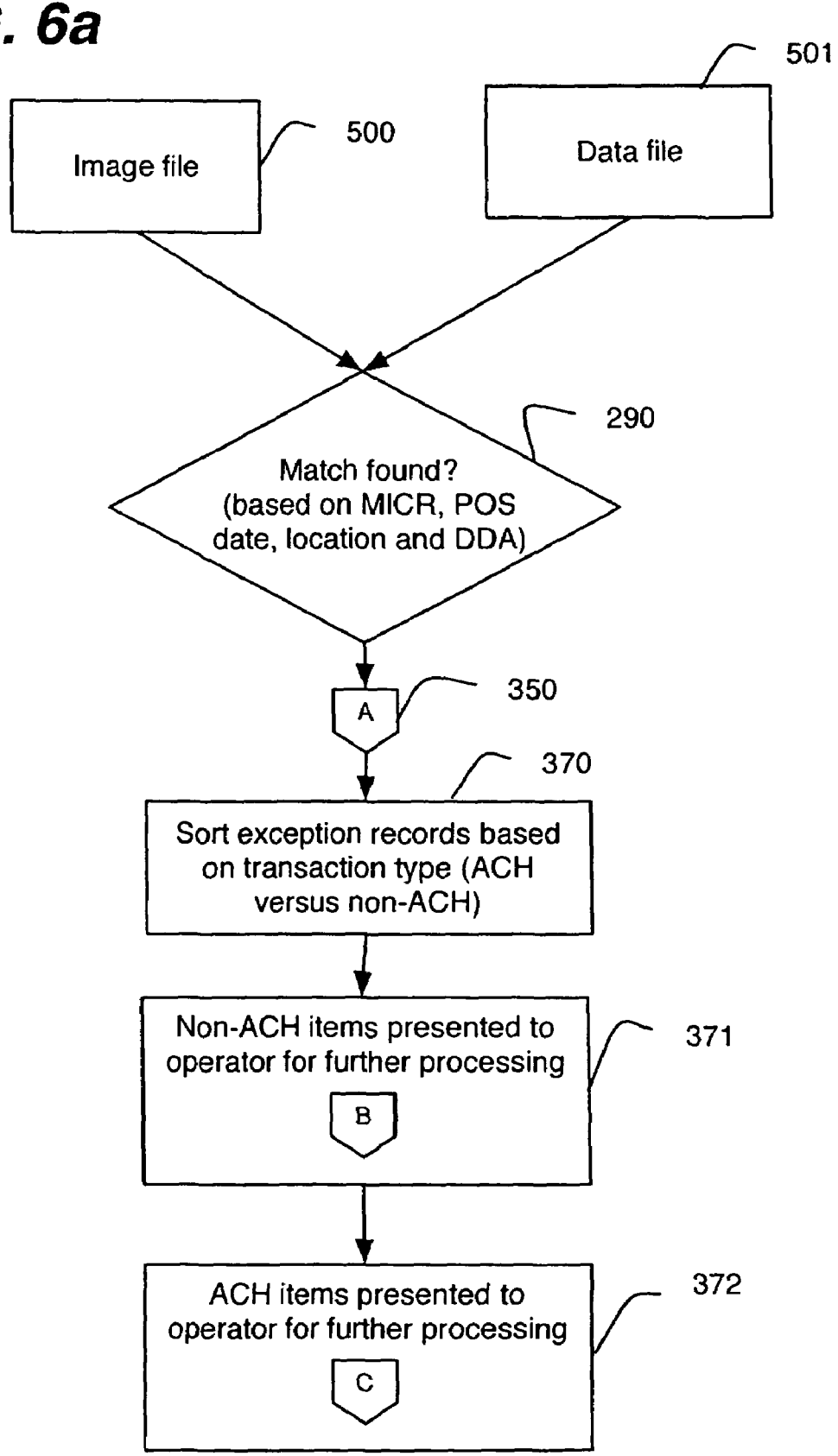
Figure 6B:
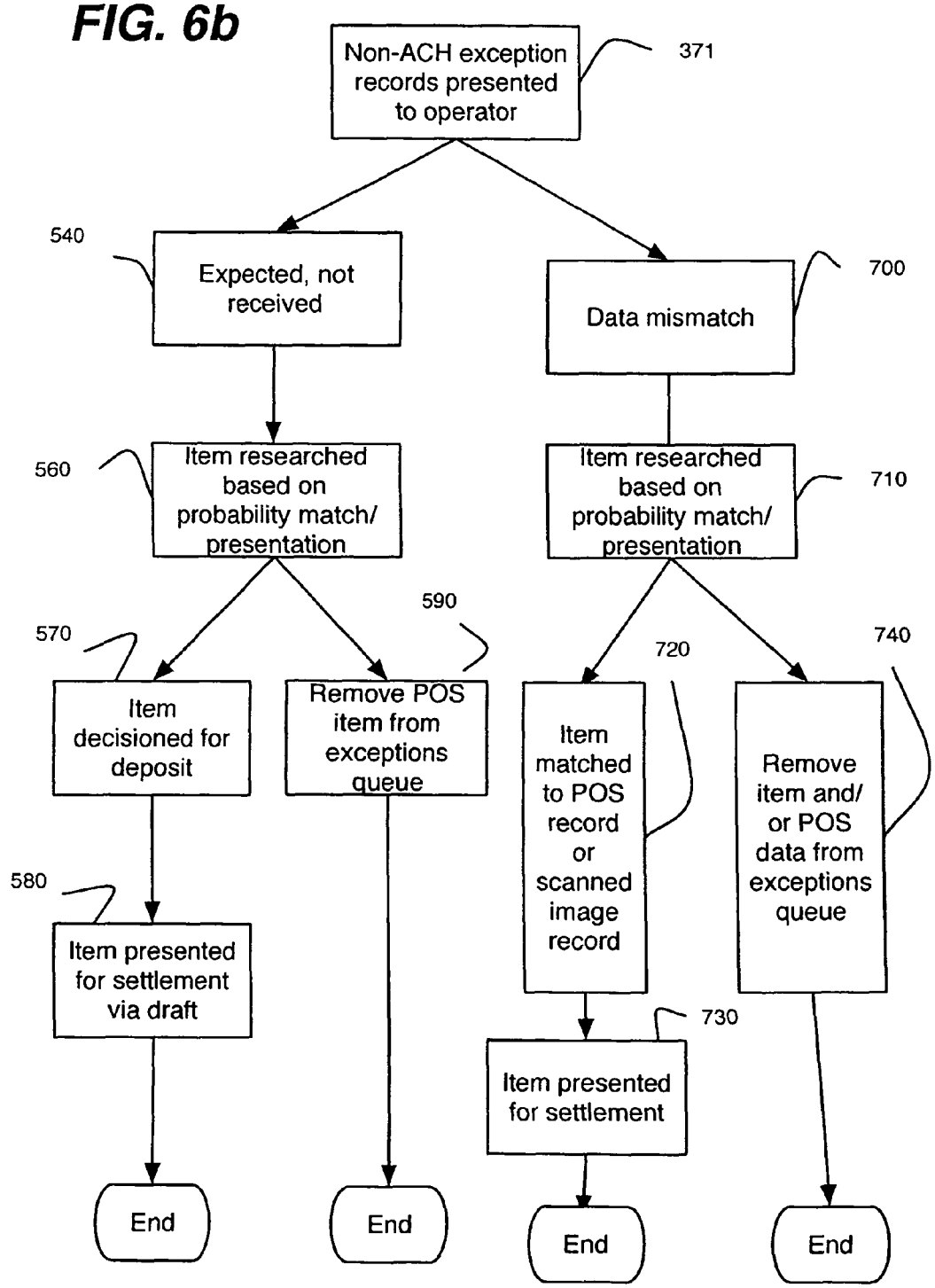
Figure 6C:
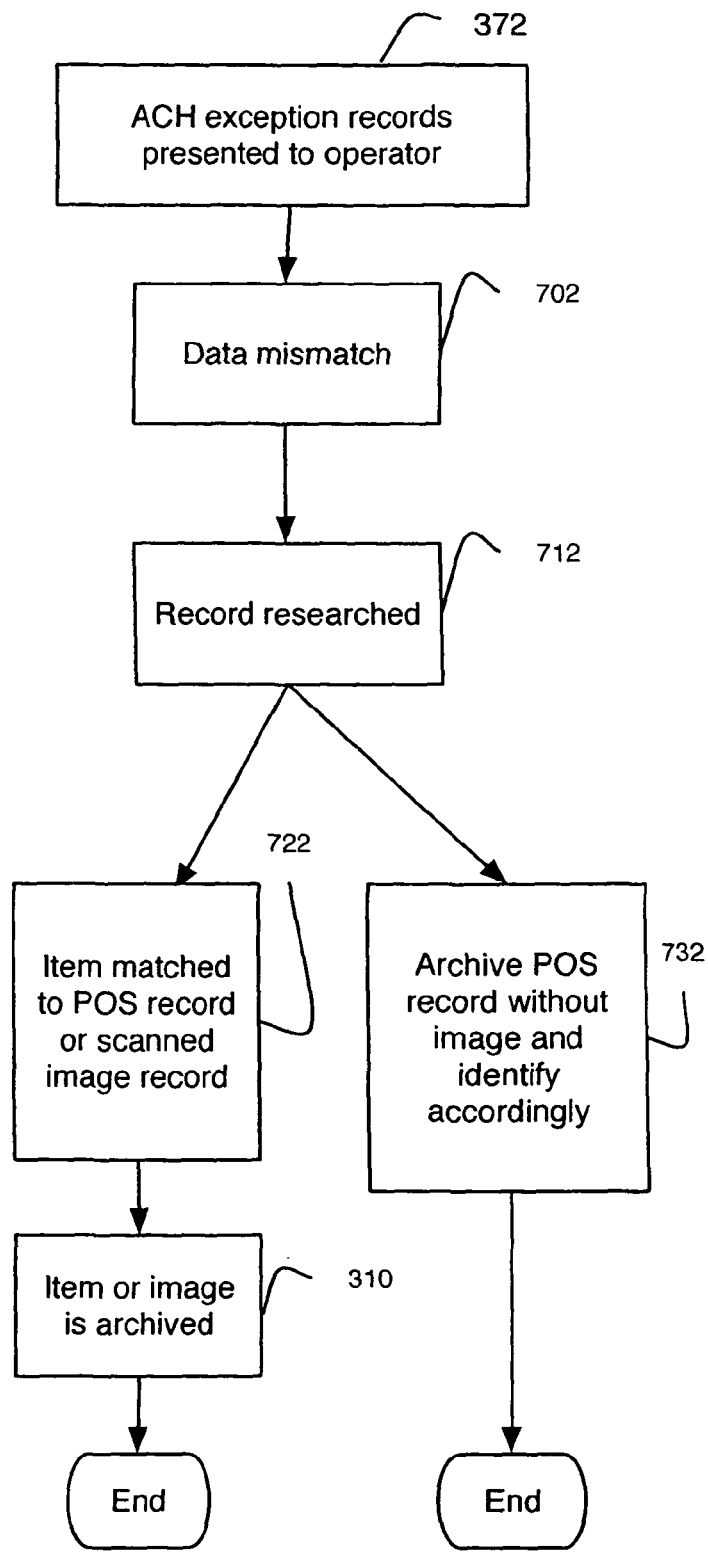

These exception records can represent transactions that are ACH-eligible and/or those that are not ACH-eligible. FIGS. 6*a-c* show a process for handling exceptions that provides for prioritized attention to non-ACH items before the ACH items. According to the exceptions process 350 of FIG. 6*a*, the exception records are sorted (370) by transaction type. The system aids in prioritizing the exceptions based on their transaction type. The system identifies and presents the non-ACH items ahead of the ACH items for further processing based on prioritization. "Ahead of" in the previous sentence means earlier in time or higher on a prioritized list of the exception records or on an earlier screen in a series of screens showing exception records. In one embodiment, the list of non-ACH exception records is displayed (371) on a computer screen via a graphical user interface linked to the TPPP database for an operator who conducts research and makes judgments about how to handle the non-ACH exception records, according to the process shown in FIG. 6*b*. "After" the non-ACH exception records are matched or managed, the ACH exception records are displayed or presented to the researcher (372) for further processing according to the protocol of FIG. 6*c*. "After" in the previous sentence may mean later in time or lower on a prioritized list or on a later or subsequent screen in a series of screens showing the exceptions. This prioritized presentation of the exceptions to the operator(s) of the non-ACH exceptions before the ACH exceptions allows for a quicker resolution of the non-ACH items. This is beneficial to merchants because the merchants do not receive funds for their non-ACH transactions (430, FIG. 4) until resolution (either through matching or through exception processing). In contrast, ACH transactions are settled to merchant accounts (190, FIG. 4) based on POS data file prior to attempts to find matching image files (290, FIG. 4).

Turning to the protocol for handling non-ACH exceptions, FIG. 6*b*, the exceptions will be generally one of two types of exceptions: either "expected not received" (540) or a data mismatch (700). As noted above, each data record includes a date by which the original item is expected and will be ready for matching and indexing. This projected date takes into account a bit of a lag time for the transport of the physical document. The image record may be missing for any of a number of reasons, including that it has been delayed in transit, that it has "piggy-backed" to another document so that it was missed in the scanning, or that the document has been lost. When the projected date passes, with no image record appearing, that data record is processed as "expected, not received" (540). The situation is then researched (560)- and, based on the results of that research, a decision is made as to what to do with the item.

The researching 560, which is done manually, automatically or via a combination of manually and automatically, is presented to the researcher automatically based on probability matching. Research most typically involves manually querying a database(s) that stores image records and/or POS data records before a final decision has been made. After the research step (560), the item is decisioned for deposit (570). In some cases, the research step will reveal that there does indeed exist a matching image record, and, in such cases, the items will be identified as a match, then presented for settlement (580). In other cases, it will be determined during research that either a POS data record or an image record requires adjustment or repair and that upon making such repair, it can be matched; in such cases the item is then flagged as "matched" and presented for settlement (580). In still other cases, when research reveals that there is no viable matching record, the POS data record can be placed back in the queue of records that will be subject to item by item matching (290, FIG. 4) on another day; this will give the image record additional time to appear. In still other cases, when research reveals that there is no viable matching record, the POS data record can be created in to a remotely created draft item and presented for settlement.

Finally, in some cases, it will be determined that the POS data record does not represent a transaction that ought to be processed. This occurs, for example when an errant POS entry is made and not deleted. Such POS data records will be removed 560 from the exception queue (590) and identified in a database field to indicate that no further attempts will be made to match it.

The second category of non-ACH exceptions is "data mismatch" (700) where a match is found based on the MICR information, but some portion of the data from the image record does not match with the data record. For such cases, the records are researched (710) and an appropriate adjustment or correction is made and the item is matched to a POS record or a scanned image record (720) and the transaction is presented for settlement (730). For records for which no match can be found and no repair is called for, the non-matching image record or POS data record is removed from the exception queue (740, is not presented for settlement at that time, and may be placed in a queue or list for research or resolution by a higher level operator or manager.

FIG. 6c shows the protocol for handling records that represent ACH transactions for which no exact match is found (372). These exceptions are of the "data mismatch" type (702). They are researched (712) to determine what must be adjusted so that the records are accurate and an appropriate adjustment or correction is made and the item is matched to a POS record (722) and archived (310). If research (712) does not result in a match, then the record is archived without being associated with an image record and it is identified as being archived without an image (732).

FIG. 6d shows an alternate protocol for handling records that represent ACH transactions for which no exact match is found. In this protocol, the system accommodates an exception of the "data mismatch" type, where the mismatch occurs with regard to the amount of the transaction. In other words, in some cases, the amount given by the record from the image data will differ from the amount give by the mating record from the POS data. (For example, the MICR and date will match, indicating that they represent the same transaction, but the amount will differ.)

As described above, ACH transactions are processed according to the data from the POS file prior to the receipt of the data from the image records and prior to the matching of image records to the POS records. Thus, by the time the records from the image files being subjected to attempts to match them to POS data records, the ACH transactions have already been submitted for clearance through the ACH network. When an amount mismatch is spotted between the POS data and the image data for a given record, a decision must be made as to whether to reverse the ACH transaction or to let it stand. For dollar discrepancies that are small and in the customer's favor, a merchant might prefer to let the original ACH transaction stand (i.e. not reverse it), because of the costs involved in reversing it and initiating a replacement transaction.

The amount mismatch protocol of FIG. 6d accommodates situations in which the amount in an image record doesn't match the amount in the associated POS record. The amount mismatch protocol provides that a merchant can set a predefined threshold(s) for the difference in these amounts that will determine how the mismatch is handled. This predefined threshold(s) is stored (750) in the database in association with the merchant's identifier. The threshold amounts may vary by merchant.

As shown in FIG. 6d, when the matching process finds (755) an amount mismatch between a record from the image file and the same record from the POS file during the automated matching process, the system and method of processing checks automatically creates an exception, presents the exception to the operator where the match is authorized and an ACH reversal is automatically triggered based on set-up. (760). The mismatched record then is researched (765) by an operator and manually matched. The system and method compares (768) the proper amount for the transaction with the amount that was submitted to ACH for processing (i.e. the amount taken from the POS data file). If the customer was overcharged (770) by more than the predefined "over" threshold, the ACH transaction is reversed (771) and a replacement transaction (via Image Exchange) is initiated (772) for the proper amount. If the customer was underchanged, the amount of the undercharge is compared to the "under" threshold set by the merchant. If the undercharge is for an amount that exceeds the "under" threshold amount (775), then the transaction is reversed (771) and a replacement transaction (via Image Exchange) is initiated (772). If, instead, the undercharge is for an amount that does not exceed the "under" threshold amount (780), then the transaction is allowed to stand and no adjustment or replacement transaction is made (781). (Mismatch amounts that are equal to the threshold are preferably treated as an adjustment where an ACH reversal is submitted and a replacement transaction (via Image Exchange) is initiated. Alternatively, mismatch amounts that are equal to the threshold can be left to stand.) In an alternate embodiment (not shown) of the adjustment protocol of FIG. 6d, the steps of notification and research can be skipped when a mismatch amount is found and where the POS amount for a given record is lower than the amount from the image of the same and where the difference does not exceed the under threshold.

Yet another step (not pictured) in processing exceptions may include reporting of exceptions by the TPPP to the merchants.

In a preferred method, the merchant's account can be credited at the initiation of the third party processor, based on the data file, before the image of the check is matched to the data file, or perhaps even before the check is imaged for ACH eligible items. ACH ineligible items are rendered processed through the Image Exchange Network upon a successful data and image match.

The system and method of identifying, sorting and prioritizing the exceptions is preferably automated or semi-automated through the use of dedicated software accessing database(s) running on computer(s) that returns its results (lists of exception records sorted and prioritized) to an operator(s) via a computer screen or on paper. Preferably, a screen display is linked to the software and databases(s) such that the operator can easily view details about each record and can update each record as warranted as a result of the operator's research. Exceptions may be identified and presented on a periodic schedule or upon operator demand.

Trial Protocol for New Merchants or Locations

One practical consideration when a merchant converts to this system and method from their existing BOC or POP conversion systems is the potential for errors, such as inadvertent processing of some check transactions twice. This might happen if a batch of check transactions are processed both by its previous method (traditional paper depository or POP) and also processed by the new system as a result of human error. When such an error happens, it will likely be discovered and can be corrected, though there is cost associated with correcting such an error, particularly for those transactions that are submitted twice, once through ACH and once as a paper deposit. To safeguard against this error, an embodiment of this system and method provides a trial protocol for transactions from a merchant or location for a predetermined time period after it begins service.

During this trial period, ACH-eligible transactions are not immediately processed as ACH transactions (i.e. they will not follow the ordinary steps 160, 170, 180 and 190 of the process shown in FIG. 4 for ACH-eligible transactions). Instead, all transactions (both ACH-ineligible and ACH-eligible) go through the matching protocol (290) described above with respect to FIG. 4. In other words, during the trial period, the transactions are held until they are matched up with an incoming paper document that is evidenced by its associated image file. Should a paper document appear that matches the transaction, it is clear that such transaction was not processed previously according to paper deposit or POP conversion, since under either, the paper document would no longer exist having been deposited via paper or returned to the customer (POP conversion). Further, the delay allows system operators and the merchant time to identify any technical glitches.

Figure 10:
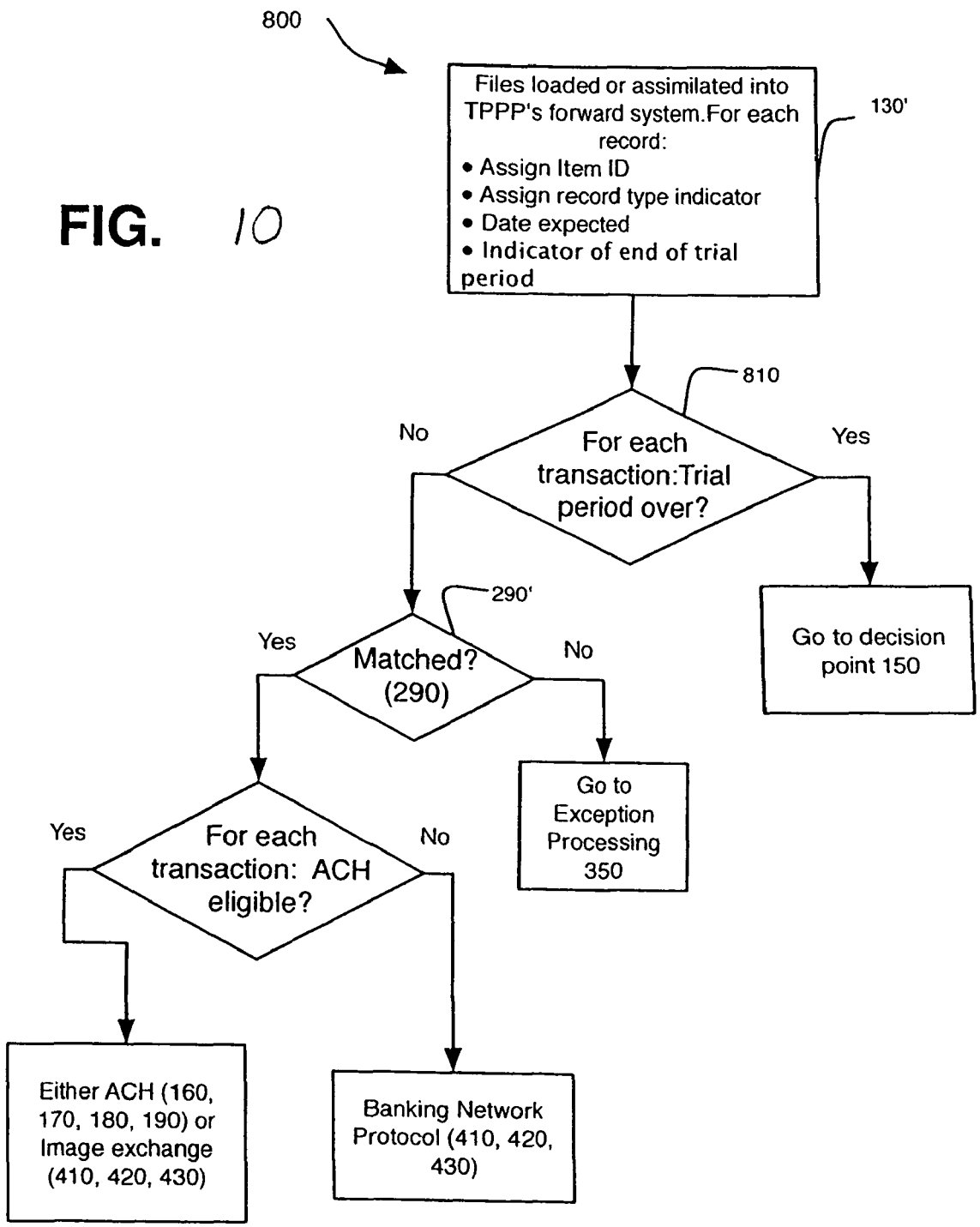
FIG. 10 is a flow chart depicting, in conjunction with FIG. 4, a trial protocol by which ACH-eligible items are submitted to matching rather than being submitted to the ACH network, during a trial period.

FIG. 10 depicts the portion of the process of FIG. 4, to the extent it differs therefrom, that accommodates the trial protocol (800). Automation of this trial protocol (800) for a new merchant or a new store location is accomplished by storing an indicator of the end of a predetermined trial time period in association with each transaction record (130'), along with an Item ID, type indicator and expected date for arrival of the paper document. Thereafter, the records are decisioned (810) to identify transactions that should be subject to follow the trial protocol. Transactions that pass through decisioning 810 at a point in time prior to the end of the trial period are subject to the trial protocol.

The indicator of the end of the trial period may be a date stored in association with the transaction record or a date stored in association with the merchant or store identifier and applied through association to all transaction records associated with the store or merchant. Alternatively, it might be a binary flag.

Automated processing that accommodates a trial protocol proceeds as follows:

i) ACH-eligible transactions that are beyond the trial period (i.e. pass through decision point 810 at a point in time after the end of the predetermined time period, or when no time period is designated) are submitted to the ACH network for settlement (150, 160, 170, 180, 190, FIG. 4);

ii) ACH-ineligible transactions that are beyond the trial period are submitted to the matching protocol that searches for image files that match data files (290, FIG. 4);

iii) ACH-eligible transactions that are not beyond the trial period (i.e pass through decision point 810 at a point in time prior to the end of the predetermined trial period) are submitted to the matching protocol to match image files to data files (290, FIG. 4);

iv) ACH-ineligible transactions that are not beyond the trial period are submitted to matching protocol to match image files to data files (290, FIG. 4).

After matching, ACH-eligible transactions can be processed either through typical settlement of ACH transactions or they can be processed through image exchange.

Store Validation Control

Another opportunity for error can occur when a merchant is using this system for some but not all of its store locations. The transactions from a non-participating location may inadvertently be included in the transactions submitted in the merchant's MICR file.

To prevent these errant transactions from being processed, the system and method incorporates a control measure of checking that the "Store ID" in the transaction records from the MICR file sent to the TPPP (120) is a store for which the merchant has contracted services prior to processing the transactions. This control is facilitated by the use of a store table in which is stored a unique record for each store Merchants assign a store number for each of their stores and provide this store number to customer service for the TPPP, and this merchant-assigned store number is then stored in a store table in association with an indication as to whether each store is supposed to have its transactions processed through this system and method. When the validation is performed, if the store number in the MICR file from the merchant does not match a pre-established store number in the TPPP system, i.e. if the store number is not associated with an indication that the store's transactions are to be processed by this system and method, then items carrying that store number will not be processed further and will be reported to the merchant. The remainder of items from stores that are to be processed by the system, are processed accordingly. In this way, it is not necessary to reject the merchant's file, or all the transaction in the merchant's file; rather, those transactions that belong in the system proceed without delay, while the errant transactions are not processed by the system.

It should be noted that this system and method has been described in the context of a coordinated effort between merchants, a third party payment processor and a high-volume image scanning entity. The system may also function with additional or fewer parties and with other divisions of labor amongst the parties. For example, the matching, indexing and exception processing steps (290) are described as being done by the TPPP, but might instead be done by the imager or another entity. As another example, the third party payment processor might perform the scanning task. Such shifts in the division of labor would be facilitated with appropriate file transfer steps. Although an illustrative version of the device is shown, it should be clear that many modifications to the device may be made without departing from the scope of the invention.

It should be noted that this system and method has been described in the context of a coordinated effort between merchants, a third party payment processor and a high-volume image scanning entity. The system may also function with additional or fewer parties and with other divisions of labor amongst the parties. For example, the matching, indexing and exception processing steps (290) are described as being done by the TPPP, but might instead be done by the imager or another entity. As another example, the third party payment processor might perform the scanning task. Such shifts in the division of labor would be facilitated with appropriate file transfer steps. Although an illustrative version of the device is shown, it should be clear that many modifications to the device may be made without departing from the scope of the invention.

I claim:

1. A method for processing a plurality of paper checks, comprising:
   a) receiving at least one data file containing a plurality of transaction records relating to a plurality of transactions, the transaction records being received without an image file;

b) scanning the plurality of paper checks with a digital image scanner thereby creating a plurality of digital image files of the paper checks;
c) submitting transaction records for ACH settlement processing;
d) comparing said digital image files with said transaction records to find matches;
e) determining a transaction amount difference by comparing a transaction amount from the matching transaction record with an image file transaction amount from the matched digital image file;
f) storing a first predefined threshold for amount mismatch, said first predefined threshold specifying an amount by which a customer can be undercharged in an ACH-processed transaction without reversing said transaction;
g) reversing ACH-processed transactions for which the transaction amount difference exceeds the predefined threshold; and
h) generating by a computer a replacement transaction for the amount indicated by the image file transaction amount in cases where the transaction amount difference exceeds the predefined threshold.

2. The method for processing paper checks according to claim 1, further comprising the step of:
i) storing said threshold in association with a merchant identifier, such that said threshold can vary by merchant.

3. A method for processing paper checks, comprising:
a) receiving, at a third party payment processor computer, at least one transaction data file containing a plurality of transaction records with each transaction record containing a transaction amount;
b) receiving, at the third party payment processor computer, a plurality of digital check images generated by scanning the paper checks with a digital image scanner, each digital check image being associated with an image file transaction amount for the paper check that was scanned to create the digital check image;
c) determining, at the third party payment processor computer, whether each transaction record is ACH-eligible or ACH-ineligible;
d) submitting, from the third party payment processor computer, ACH-eligible transaction records to the ACH network for settlement;
e) after submitting ACH-eligible transaction records to the ACH network for settlement, matching the ACH-eligible transaction records to a matched digital check image for the same check transaction; and
f) determining a transaction amount difference by comparing the transaction amount from the matching transaction record with the image file transaction amount from the matched digital check image;
g) determining whether the transaction amount difference exceeds a predefined threshold;
h) reversing ACH-processed transactions for which the transaction amount difference exceeds the predefined threshold; and
i) generating by a computer a replacement transaction for the amount indicated by the image file transaction amount in cases where the transaction amount difference exceeds the predefined threshold.

4. The method of claim 3, wherein i) each transaction record further comprises MICR information, ii) each digital check image further comprises MICR information, and iii) the matching step e) further comprises comparing the MICR information from the transaction record with the MICR information from the digital check image.

5. The method of claim 3, wherein the predefined threshold differs by merchant.

6. The method of claim 5, wherein the transaction records are associated with a merchant identifier, further wherein the merchant identifier is further associated with the predefined threshold.

7. The method of claim 6, wherein a first subset of transaction records are associated with a first merchant identifier which is further associated with a first predefined threshold, and further wherein a second subset of transaction records are associated with a second merchant identifier which is further associated with a second predefined threshold, further wherein the first and second predefined thresholds are different.

8. A method for processing paper checks, comprising:
a) receiving, at a third party payment processor computer, a plurality of transaction records relating to a plurality of check transactions, each transaction record being associated with a data transaction amount;
b) submitting a first portion of the transactions described in the transaction records for ACH processing;
c) receiving a plurality of digital image files at the third party payment processor computer after submitting the first portion of transactions for ACH processing, with each digital image file containing an image transaction amount;
d) comparing said digital image files with said transaction records to find a matching digital image and a matching transaction record relating to the same check transaction;
e) comparing the data transaction amount on the matching transaction records to the image transaction amount on the matching digital image files to determine a transaction amount difference;
f) determining whether the transaction amount difference exceeds a predefined threshold;
g) reversing ACH-processed transactions for which the transaction amount difference exceeds the predefined threshold; and
h) generating by a computer a replacement transaction for the amount indicated by the image transaction amount in cases where the transaction amount difference exceeds the predefined threshold.

9. The method of claim 8, wherein the predefined threshold differs by merchant.

10. A method for processing paper checks, comprising:
a) receiving, at a third party payment processor computer, a plurality of transaction records relating to a plurality of check transactions, each transaction record being associated with a data transaction amount;
b) submitting a first portion of the transactions described in the transaction records for ACH processing;
c) scanning the paper checks associated with the check transactions to create a plurality of digital image files, with each digital image file containing an image transaction amount;
d) comparing said digital image files with said transaction records to find a matching digital image and a matching transaction record relating to the same check transaction;
e) comparing the data transaction amount on the matching transaction records to the image transaction amount on the matching digital image files to determine a transaction amount difference;
f) determining whether the transaction amount difference exceeds a predefined threshold;

g) reversing ACH-processed transactions for which the transaction amount difference exceeds the predefined threshold; and h) generating by a computer a replacement transaction for the amount indicated by the image transaction amount in cases where the transaction amount difference exceeds the predefined threshold.

11. The method of claim 10, wherein the scanning step c) occurs after submitting the first portion of transactions for ACH processing.

12. The method of claim 11, further comprising, when the transaction amount difference exceeds the predefined threshold, reversing ACH-processed transactions and generating a replacement transaction for the amount indicated by the image transaction amount.

13. The method of claim 10, further comprising, when the transaction amount difference exceeds the predefined threshold, reversing ACH-processed transactions and generating a replacement transaction for the amount indicated by the image transaction amount.

14. A system for processing paper checks, comprising:
a) a data connection that receives a plurality of transaction records, each transaction record containing a data transaction amount, the transaction records being received without an image file;

b) a digital image scanner that scans the paper checks to create digital image files, the digital image files each containing an image transaction amount; and c) a processor configured to:
i) submit a first portion of the transaction records for ACH processing,
ii) compare said digital image files with said transaction records to find a matching digital image file and a matching transaction record,
iii) compare the data transaction amount on the matching transaction records to the image transaction amount on the matching digital image files to determine a transaction amount difference,
iv) determine whether the transaction amount difference exceeds a predefined threshold,
v) reverse ACH-processed transactions for which the transaction amount difference exceeds the predefined threshold; and
vi) generate a replacement transaction for the amount indicated by the image file transaction amount in cases where the transaction amount difference exceeds the predefined threshold.

\* \* \* \* \*

UNITED STATES PATENT AND TRADEMARK OFFICE
CERTIFICATE OF CORRECTION

PATENT NO. : 8,301,567 B2
APPLICATION NO. : 12/387131
DATED : October 30, 2012
INVENTOR(S) : Kari Hawkins Page 1 of 1

It is certified that error appears in the above-identified patent and that said Letters Patent is hereby corrected as shown below:

IN THE DRAWINGS:
Sheet 9 of 13 (Above 770)
(Fig. 6d)
Line 4
Delete "theshold" and insert --threshold--, therefor.

Column 14
Line 22
Delete "underchanged," and insert --undercharged,--, therefor.

Signed and Sealed this
Nineteenth Day of March, 2013

Teresa Stanek Rea
*Acting Director of the United States Patent and Trademark Office*